Oct. 18, 1960
J. T. FISHER
2,956,587
SECTIONAL DUCT
Filed Nov. 17, 1958
2 Sheets-Sheet 1
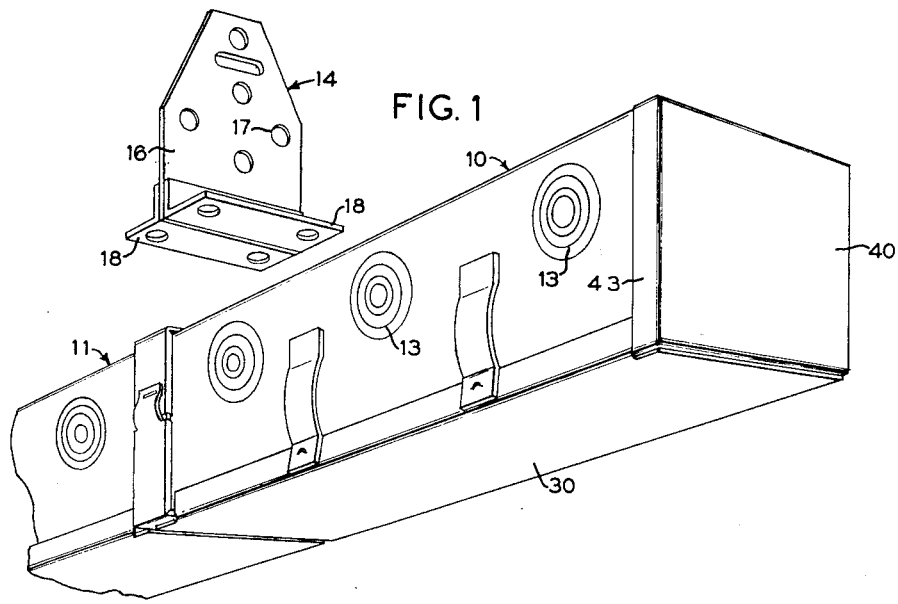
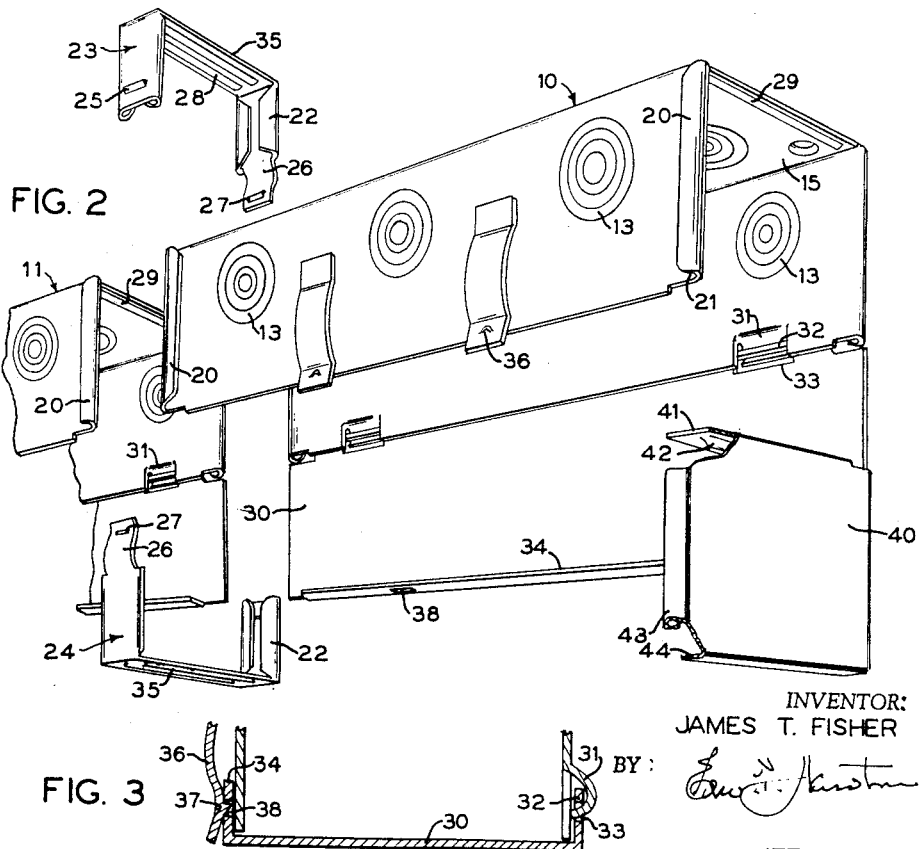
INVENTOR:
JAMES T. FISHER
BY:
ATTORNEY Oct. 18, 1960  J. T. FISHER  2,956,587
SECTIONAL DUCT
Filed Nov. 17, 1958  2 Sheets-Sheet 2

INVENTOR:
JAMES T. FISHER
BY:
ATTORNEY

United States Patent Office 2,956,587
Patented Oct. 18, 1960

2,956,587

SECTIONAL DUCT

James T. Fisher, Decatur, Ga., assignor to B & C Metal Stamping Company, Atlanta, Ga., a corporation of Georgia Filed Nov. 17, 1958, Ser. No. 774,297

4 Claims. (Cl. 138—75)

This invention relates to a sectional duct, and is particularly concerned with a sectional duct formed of combinations of preformed duct members which may be joined to form a single continuous duct of any such length as circumstances may demand.

The present invention provides a duct of the type set forth which may be fully opened to form a trough for the reception of wires, cables, tubing or the like. The duct sections are interengaged by pairs of cooperating generally U-shaped securing clips. This arrangement is such that the sections may be preliminarily united by only one of each pair of the securing clips to retain the duct sections in longitudinal interengaged relation so that with their covers open or removed, the sections define an open trough free of bridging structures. After lengths of cables, wires, tubing, pipe or the like have been laterally inserted through the unrestricted open mouth of the trough, the second U-shaped clip of the securing pair may be engaged over the open mouth of the trough at the juncture of the duct sections and interengaging the outer clip to move firmly and permanently secure said sections together. The application of the second clip of each pair also provides a retaining means for precluding any inadvertent displacement of the length of material from the trough. The invention further provides covers by which the trough may be closed. Such covers are formed to interengage the securing clips to preclude inadvertent displacement thereof.

In the illustrated form of the invention, alternate types of covers are presented. In one instance the covers are hingedly and permanently secured to each duct section, in which case the covers are formed with side flanges to engage the sides of the ducts to give strength and rigidity to the closed structure. In another form of the invention the covers are flat plates adapted to be secured by screws or equivalent threaded means, the plates being longitudinally slidable after tentative engagement with the open mouth of the troughs. Such sliding movement provides for the location of the terminal ends of the covers over the interengaging clips to preclude inadvertent displacement thereof. In this instance the duct sections are formed with internally extending flanges to which the covers are engaged.

It is among the objects of the present invention to provide a novel and improved sectional duct and novel and improved means to secure and retain a rigid union between individual prefabricated sections thereof.

Another object of the present invention is the provision of novel and improved clips for duct sections by which such individual sections may be secured in longitudinal end-to-end relation to form an open trough without bridging, blocking of obstructing elements which would preclude the lateral insertion of continuous lengths of cables, wires, tubing or pipe and without the necessity of threading such material under such obstructions.

It is a further object of the present invention to provide interconnecting clips for adjacent elements of a sectional duct so constructed and arranged as to be readily applied and removed without requirement of special tools and being adapted for retention in their interengaging position by associated means forming part of the associated trough sections.

The objects of the invention also include that of providing novel and improved closure means for otherwise open duct sections by which the ducts may be covered to enclose lengths of cable, wire, tubing, pipe or the like therein, which closure means may serve to retain interconnecting clips in their interconnected position rigidly locking the individual sections together.

It is also an object of the present invention to provide novel and improved end closure elements for sectional ducts which may be readily applied and removed by simple lateral motion and which may be secured in position by associated sections of the duct.

An additional object of this invention is to provide a new and improved sectional duct arrangement which lends itself admirably to use as a highly accessible raceway as well as a service entrance where desired.

Numerous other object, feature and advantage of the present invention will be apparent from consideration of the following specification taken in conjunction with the accompanying drawings wherein like designators refer to the same or similar parts throughout the several views, and in which:

Fig. 1 is a perspective view of one form of the present invention.

Fig. 2 is an exploded perspective view of that form of the invention shown in Fig. 1.

Fig. 3 is a fragmentary detail, partly in cross section, showing the cover hinge and tongue securing arrangements of that form of the invention shown in Figs. 1 and 2.

Figure 4:
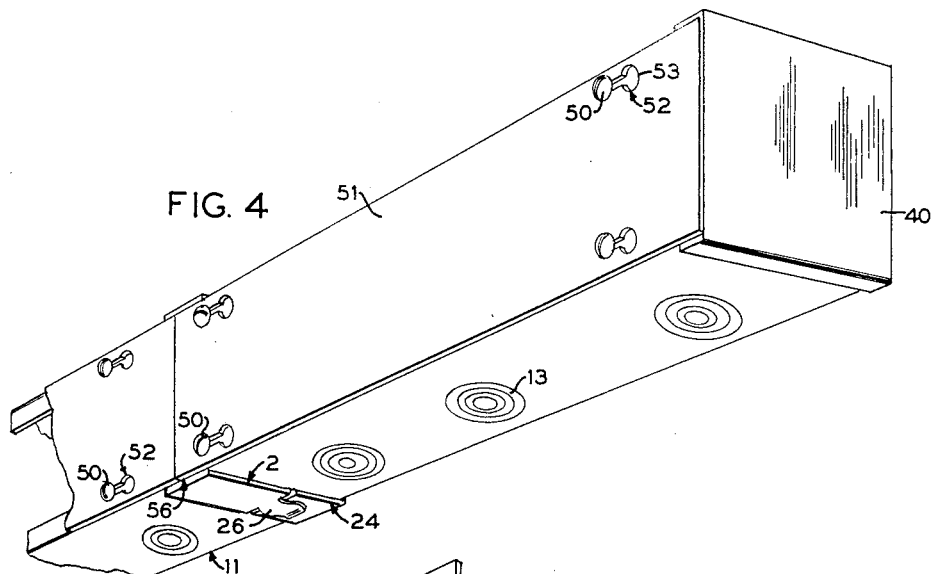
Fig. 4 is a perspective view of a modified form of the sectional duct of the present invention.

In that form of the invention illustrated in Figs. 1 and 2, individual duct sections are indicated generally by the numerals 10 and 11. Each section comprises an elongate body of generally square cross section, having one side thereof pivotable so as to permit opening of the duct therealong to receive rigid conduits, metallic tubing, flexible conduits, wires, cable and surface metal raceways as required. It will, of course, be understood that various lengths of the individual sections may be arranged in longitudinal alignment so as to make up total lengths as desired. Although knockout clusters 13 are formed at suitably spaced intervals along each duct for connections therewith of runners and small lines, it will be understood that conduit sections of T or elbow configuration may be included in a complete layout of sectional ducts of the present invention, the interconnection, securement and closure thereof being in keeping with the manner of interengagement, securement and closure of the duct sections herein set forth. While the polysided duct formed by sections 10 and 11 may be arranged to present its openable side in vertical or horizontal position, the sections of Figs. 1 and 2 are admirably adapted for interconnection to form a downwardly opening duct, and for this purpose the duct sections may be hung from vertically disposed T-shaped brackets 14 bolted or riveted to the upper horizontal webs 15 at the ends of interconnected sections or at such spacing as may be required. The upper vertical shank 16 of each bracket is provided with an aperture as at 17 to accommodate such securing means as desired so as to suspend the duct from a ceiling, overhead rafters, beams, girders, pipes or the like. The lower diverging feet 18 of each bracket are apertured to receive securing elements passing through the webs 15 of the individual units.

For interconnecting aligned adjacent abutting ends of the duct sections, the ends of each section are formed with outwardly return-bent side flanges 20 which define ways 21 that receive in interlocking engagement the inwardly turned flanges 22 of identical upper and lower generally U-shaped securing clips 23 and 24, respectively. Each clip is formed on the outside of one leg thereof with a transverse protrusion forming a shoulder 25, while the opposite leg of each clip is formed on the inside thereof with a tongue 26 defining a latch projection 27. This arrangement is such that when the companion clips are secured about the opposite sides of abutting duct sections, the projection 27 of each tongue 26 will engage and latch with the outwardly projecting shoulder 25 of the companion clip, whereby said clips will be firmly retained as a unit in encircling relation, with the abutting flanges of the sections secured beneath the flanges 22 of the companion clips.

An important feature of the present invention is the clip relationship by which the upper clip 23 may be fitted over the oppositely directed abutting flanges 20 of adjacent sections to temporarily secure said sections together while leaving the trough formed by the open mouths of the interconnected sections open for free lateral disposition within the combined sections of pipes, cables, wires, tubing or the like. In this respect it will be noted that the intermediate body portion of each clip is formed with a pair of elongate parallel protrusions 28, each of which is adapted for complementary registration with an elongate indentation 29 adjacent the terminal edge of the bottom side of each duct section. It will, of course, be obvious that such preliminary interconnection of the sections leaves the full length of the duct open as a trough for the reception of such material so as to facilitate the application and removal of the same and to permit service entrance connections. This arrangement avoids bridging elements heretofore required in the interconnection of such duct sections and hence the necessity for threading material lengths under any such abridging elements.

As shown more clearly in Fig. 3, the pivotable side of each duct section is a generally flat cover 30 formed with laterally extending tubular rolled hinge pieces 31 which are adapted to be engaged by pintles 32 formed by side wall material adjacent inwardly extending hinge apertures 33 of the side walls. As indicated at 34, the outer free edge of each cover 30 is provided with an inwardly turned flange which, when the cover is closed, engages over the outer edge of the opposite side wall of its section. An important feature of the present invention is the design and construction of the hinge covers of a length equal to the total length of the individual duct sections. In closed position, the outer ends of the covers engage over the return-bent flanges of the ends of the opening and over the intermediate body portions 35 of each of the companion clips which are in united encircling relation interengaging abutting ends of adjacent sections. With the covers closed, the disassembly of the uniting clips is precluded by the disposition thereover of the ends of the covers. To effect releasable securement of each section cover, the side wall of each section opposite the hinging side wall is provided with relatively resilient tongues 36 having inwardly projecting shoulders 37 adapted to engage in apertures 38 in its companion cover flange 34.

For terminal closure of the length of conduit formed by the individual duct sections, there is provided an end plate 40 of general rectangular outline. The edges of end plate 40 conform with the intermediate or back wall of the individual sections, the bottom edge being inwardly bent to form a stop flange 41 having an elongate indentation 42 for registration with the elongate inside projection of the outside indentation 29 adjacent the terminal edge of the bottom side of each section. The opposite side walls of the end plate are formed with return-bent flanges 43 to provide a way or channel for fitting over and receiving therein the terminal flanges of the section to which it is applied. The outer side edge of the end plate is formed with an inwardly bent portion 44 that is adapted to be superimposed by the terminal edge of cover 30 so as to secure the enclosure in position against inadvertent displacement.

Figure 5:
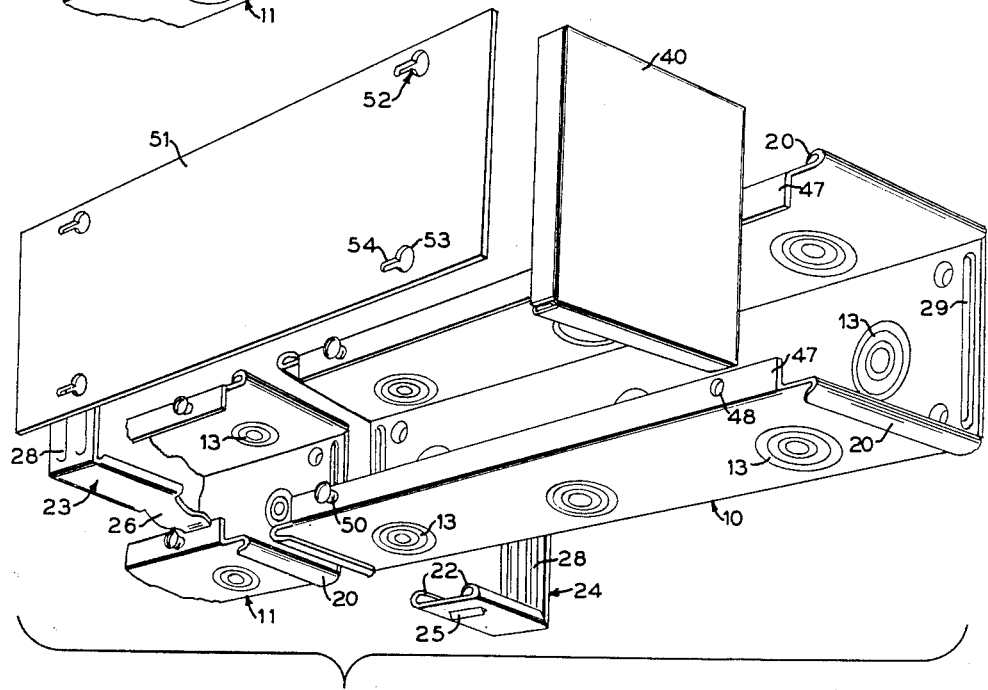
Fig. 5 is an exploded perspective view of that form of the invention illustrated in Fig. 3.

In that form of the invention shown in Figs. 4 and 5, a like channel construction and arrangement of the individual duct sections is employed; and, insofar as the structures are identical, like numbers are applied to those referred to in the description of Figs. 1 and 2. The description of such parts as hereinbefore presented with respect to Figs. 1 and 2 therefore fully applies to Figs. 4 and 5 and repetition thereof is deemed unnecessary. However, the open edge arrangement of the elements shown in Figs. 4 and 5 differs in that of such open edges are formed with flanges 47 which are provided with internally threaded apertures 48 for the reception of cover securing screws 50.

The cover for that form of the invention shown in Figs. 4 and 5 is a bodily removable flat plate 51 having key-hole type apertures 52 positioned for registration with the apertures 48 in duct section flanges 47. Cover plates 51 are bodily removable from the individual duct sections to expose the free mouthed trough in the manner discussed with respect to Figs. 1 and 2. The cover plates are adapted to be secured in closed position by the screws 50, with the enlarged ends 53 of the keyhole slots 52 passing over the heads of the screws to apply the covers with the screw shanks in line with the restricted portion 54 of the keyhole slots. After application of the covers, longitudinal movement thereof to engage the restricted portion 54 of slots 52 under the heads of screws 50 will position the end edges of the cover over the outer end securing clip, as at 56, to retain the clip against displacement. The tightening of the screws will, of course, lock the plates in such longitudinal position, preventing accidental displacement.

It will be seen from the foregoing that the present invention provides a novel, simple and improved sectional duct, the individual sections of which may be arranged and secured in longitudinal abutting relation to form a continuous trough permitting the lateral insertion of extended lengths of wires, cables, tubing or the like, and to permit service entrance connections where desired throughout the duct system. It will be seen that the closure of the trough by the covers in each instance provides for locking one of the securing clips in position against inadvertent displacement. In the practice of the present invention, numerous changes, modifications and the full use of equivalents may be resorted to without departure from the spirit or scope of the invention as defined by the following claims.

I claim:

1. In a sectional duct, the combination with adjacent open sided duct sections arranged in end-to-end abutting relation, of open sided interengaging clips outside of said sections and uniting the abutting ends of said sections, the open sides of said clips conforming with the open sides of said sections to form an unobstructed trough, and cooperating open sided clips interengageable with said first mentioned clips to bridge said trough after lateral insertion of lengths of material in said trough, together with covers for said sections at least partially overlying said second mentioned clips and engageable therewith to restrain said clips against inadvertent displacement.

2. In a sectional duct, the combination with adjacent open sided duct sections arranged in end-to-end abutting relation of open sided interengaging clips outside of said sections and uniting the abutting ends of said sections, the open sides of said clips conforming with the open sides of said section to form an unobstructed trough, and cooperating open sided clips interengageable with said first mentioned clips to bridge said trough after lateral insertion of lengths of material in said trough, together with covers for said sections at least partially overlying said second mentioned clips and engageable therewith to restrain said clips against inadvertent displacement, said trough being substantially U-shaped in transverse section and said clips being U-shaped in conformity therewith.

3. In a sectional duct, the combination with adjacent open sided duct sections arranged in end-to-end abutting relation of open sided interengaging clips outside of said sections and uniting the abutting ends of said sections, the open sides of said clips conforming with the open sides of said sections to form an unobstructed trough, and cooperating open sided clips interengageable with said first mentioned clips to bridge said trough after lateral insertion of lengths of material in said trough, together with covers for said sections at least partially overlying said second mentioned clips and engageable therewith to restrain said clips against inadvertent displacement, said trough being substantially U-shaped in transverse section and said clips being U-shaped in conformity therewith, the first mentioned and second mentioned clips being identical in form.

4. A sectional duct assembly including a plurality of transversely rectangular duct sections of sheet metal arranged in end-to-end abutting relation, return-bent flanges at the ends of said sections defining side securing clip receiving ways, pairs of U-shaped securing clips arranged in confronting relation, each clip being engaged within the ways of each side of each pair of abutting sections, each clip being identical with each other clip and including a detent interengaging the other, and a cover for each section engageable over one clip of each pair of clips at the ends of said sections.

References Cited in the file of this patent
UNITED STATES PATENTS

| | | |
|---|---|---|
| 1,986,965 | Frank | Jan. 8, 1935 |
| 2,353,121 | Adam et al. | July 11, 1944 |
| 2,714,424 | Arkinson | Aug. 21, 1955 |
| 2,905,201 | McNaughton | Sept. 22, 1959 |
| 2,917,083 | Duvall et al. | Dec. 15, 1959 |
| 2,921,607 | Caveney | Jan. 19, 1960 |

FOREIGN PATENTS

| | | |
|---|---|---|
| 517,209 | Great Britain | Jan. 23, 1940 |
| 685,964 | Great Britain | Jan. 14, 1953 |

OTHER REFERENCES

Publication, Duc-Pac Bulletin 654, published by Duc-Pac, Inc., East Longmeadow, Mass. (received in U.S. Patent Office Nov. 16, 1956), copy in Div. 11, 138–75.